United States Patent
Federspiel et al.

(10) Patent No.: US 8,688,243 B2
(45) Date of Patent: *Apr. 1, 2014

(54) METHOD AND APPARATUS FOR CONTROLLING FANS IN HEATING, VENTILATING, AND AIR-CONDITIONING SYSTEMS

(75) Inventors: Clifford Federspiel, El Cerrito, CA (US); Kurt Federspiel, El Cerrito, CA (US)

(73) Assignee: Vigilent Corporation, El Cerrito, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,700

(22) Filed: May 25, 2012

(65) Prior Publication Data

US 2012/0239208 A1    Sep. 20, 2012

Related U.S. Application Data

(63) Continuation of application No. 12/426,672, filed on Apr. 20, 2009, now Pat. No. 8,190,273.

(60) Provisional application No. 61/046,348, filed on Apr. 18, 2008.

(51) Int. Cl.
    *G06F 19/00*    (2011.01)

(52) U.S. Cl.
    USPC .................................. 700/17; 700/29; 710/15

(58) Field of Classification Search
    USPC ............ 700/1–3, 17, 29, 71, 66, 42–46, 183, 700/276–278, 299–300; 710/8, 15, 17, 104; 717/171
    See application file for complete search history.

(56) References Cited

U.S. PATENT DOCUMENTS

| | | | |
|---|---|---|---|
| 4,437,608 A | 3/1984 | Smith | |
| 4,630,670 A | 12/1986 | Wellman et al. | |
| 4,718,021 A * | 1/1988 | Timblin | 700/277 |
| 4,836,095 A | 6/1989 | Wright, Jr. | |
| 5,170,935 A | 12/1992 | Federspiel et al. | |
| 5,464,369 A | 11/1995 | Federspiel | |
| 5,540,619 A | 7/1996 | Ahmed | |
| 5,550,752 A | 8/1996 | Federspiel | |
| 5,573,181 A | 11/1996 | Ahmed | |
| 5,768,121 A | 6/1998 | Federspiel | |
| 5,862,982 A | 1/1999 | Federspiel | |
| 5,863,246 A * | 1/1999 | Bujak, Jr. | 454/255 |
| 5,875,109 A | 2/1999 | Federspiel | |
| 6,227,961 B1 | 5/2001 | Moore et al. | |
| 6,557,574 B2 | 5/2003 | Federspiel | |
| 6,719,625 B2 | 4/2004 | Federspiel | |

(Continued)

*Primary Examiner* — Kidest Bahta
(74) *Attorney, Agent, or Firm* — Kilpatrick Townsend & Stockton, LLP; David B. Raczkowski

(57) ABSTRACT

Systems, apparatus, and methods of controlling a variable-speed fan of an environmental maintenance module that controls temperatures of a plurality of zones of a building are provided. A first critical zone of the building is identified by analyzing the first zone temperature errors, which are used to determine a final speed setting of the variable-speed fan. Systems, apparatus, and methods of calibrating an environmental maintenance module that controls a temperature of a zone of a building are also provided. A location parameter is calculated for a plurality of zone temperatures, and a scale parameter is computed that quantifies a variation of the zone temperatures relative to a location parameter. A first temperature setpoint for the zone is determined and used in controlling the temperature of the zone.

25 Claims, 8 Drawing Sheets

(56) References Cited

U.S. PATENT DOCUMENTS

| | | |
|---|---|---|
| 7,117,129 B1 | 10/2006 | Bash et al. |
| 2002/0020446 A1 | 2/2002 | Federspiel |
| 2002/0120367 A1* | 8/2002 | Emberty et al. .............. 700/282 |
| 2003/0064676 A1 | 4/2003 | Federspiel |
| 2006/0116067 A1 | 6/2006 | Federspiel |
| 2006/0206291 A1 | 9/2006 | Bash et al. |
| 2006/0240764 A1* | 10/2006 | Pierce et al. .................. 454/329 |
| 2008/0218439 A1* | 9/2008 | Uemura et al. ................. 345/55 |
| 2008/0264086 A1* | 10/2008 | Liu ................................. 62/180 |
| 2008/0281439 A1 | 11/2008 | Salsbury |

\* cited by examiner

METHOD AND APPARATUS FOR CONTROLLING FANS IN HEATING, VENTILATING, AND AIR-CONDITIONING SYSTEMS

This application is a continuation application of U.S. patent application Ser. No. 12/426,672, entitled "METHOD AND APPARATUS FOR CONTROLLING FANS IN HEATING, VENTILATING, AND AIR-CONDITIONING SYSTEMS", filed on Apr. 20, 2009, which claims the benefit of U.S. Provisional Application No. 61/046,348, entitled "METHOD AND APPARATUS FOR CONTROLLING FANS IN HEATING, VENTILATING, AND AIR-CONDITIONING SYSTEMS", filed on Apr. 18, 2008, the entirety of which is incorporated by reference herein.

BACKGROUND

The present invention relates to controls for heating, ventilating, and air-conditioning (HVAC) systems, specifically to controlling a fan speed control for HVAC systems and calibrating HVAC systems.

Modern buildings can have complex HVAC systems to control indoor temperature, pressure, ventilation rate, and other variables in a way that makes efficient use of energy. One way to conserve energy in these systems is to use a so-called variable-air-volume design. Key components of a variable-air-volume system are a fan, a fan motor, and a fan speed modulation device. The fan is a prime mover that causes air to move. The motor, which is typically an alternating current motor for HVAC fans, converts electrical energy to mechanical energy to operate the fan. A fan speed modulation device is typically a variable frequency drive (VFD) for an alternating current motor.

Some VAV systems were originally designed as constant volume HVAC systems, then converted later to VAV operation to conserve energy. Some of these conversions leave the original terminals in place. Constant volume terminals either do not have dampers or they have mixing dampers that mix hot air with cold air. Constant volume terminals without dampers are called reheat terminals. Constant volume terminals with mixing dampers are called dual-duct terminals. Sometimes the dual-duct terminals are located at the air-handling unit, in which case the air-handling unit is usually referred to as a multi-zone system.

One control strategy for the fan of variable-air-volume systems is to regulate a static pressure in a duct at a point downstream of the fan. In large systems or dual-duct systems, it is common to measure the duct pressure at more than one point and control the minimum reading to a setpoint. This strategy seeks to keep the static pressure at a measurement point constant at all times. Control strategies based on a constant static pressure in the duct have been proposed in U.S. Pat. No. 4,437,608 to Smith (1984) and U.S. Pat. No. 6,227,961 to Moore et al. (2001). U.S. Pat. No. 4,836,095 to Wright (1989) describes a variant of this strategy for systems that have multi-speed fans rather than fans in which the speed is continuously variable. A rule of thumb for this strategy is to locate the pressure sensor two-thirds of the distance from the fan to the end of the duct. A problem with this strategy is that it is inefficient at part-load conditions, when the flow rate is significantly lower than a design flow rate, which is the flow rate at which the system should operate when the fan is running at full speed.

Another control strategy that overcomes the problem of constant static pressure control is one in which a static pressure setpoint is reset based on a position of a terminal damper that is most open. Control strategies that reset the static pressure based on the position of the terminal damper that is most open have been proposed in U.S. Pat. No. 4,630,670 to Wellman and Clark (1986) and U.S. Pat. No. 5,863,246 to Bujak (1999). An objective is to keep this damper nearly open or completely open. Doing so reduces throttling losses at part-load conditions. One problem with resetting static pressure based on the position of the most-open terminal damper is that it requires that the control system be able to measure the position of every terminal damper. Large systems could have hundreds of terminal dampers. Requiring terminal damper position measurement adds cost to the HVAC system.

Another problem with resetting static pressure based on the position of the most-open terminal damper is that it is sensitive to a communications failure. The terminal dampers are usually located far from the fan, so a digital communication network is used to connect the terminal unit control device, which knows the terminal damper position, with the fan control device. A failure in the network connecting these devices will cause the control strategy to fail.

Yet another problem with resetting static pressure based on the position of the most-open terminal damper is that it is sensitive to a terminal unit failure. If one of the terminal units is not working properly, then the resetting strategy will not work properly.

Yet another problem with resetting static pressure based on the position of the most-open terminal damper is that it is sensitive to a design flaw in which one or more terminal dampers is undersized. In this case the undersized terminal damper will require high pressure to achieve its required flow, causing large throttling losses at the terminal dampers that are not undersized.

Yet another problem with resetting static pressure based on the position of the most-open terminal damper is that it is difficult to tune. The most efficient operating point is when the most-open damper is completely open. If the strategy tries to keep the most-open damper completely open then the strategy cannot determine if the duct pressure is too low. If the controller tries to keep the most-open damper nearly completely open, then when it becomes completely open due to a disturbance in the system, the strategy cannot determine if the pressure is just slightly too low or far too low.

Several variants of static pressure resetting have been used. For example, one strategy resets the static pressure based on an average position of a set of terminal dampers that are most open. The averaging feature allows this strategy to reduce the energy consumption at part load conditions even if a small number of terminal units fail or are undersized. However, the strategy is still limited by the need for terminal damper position sensing, is still sensitive to network failure, and is still difficult to tune.

A strategy for modulating the fan of HVAC systems originally designed for constant volume operation is described in United States patent application 20060161306 to Federspiel. This strategy uses discharge air temperature sensors as feedback for adjusting the fan speed. That strategy attempts to keep the highest discharge air temperature as high as possible or the lowest discharge air temperature as low as possible so that the zones are heated or cooled with a higher absolute temperature difference between the discharge and the zone, but at reduced flow.

More complex strategies for controlling fans have been proposed in U.S. Pat. Nos. 5,540,619 and 5,573,181, both to Ahmed (1996). These inventions require the measurement of flow or pressure in all branches downstream of the fan in addition to measurement of the position of each terminal damper. Consequently, they have all the problems of the static pressure resetting inventions described above.

Accordingly, a need exists for a fan control strategy that can improve the part-load efficiency of fans in variable-air-volume systems without requiring the added cost of position measurements, without being sensitive to communications system failure, and being easy to calibrate.

BRIEF SUMMARY

Embodiments of the invention provide systems and methods for providing a controlling of one or more fans of a variable-air-volume heating, ventilating, and air-conditioning system (VAV-HVAC). The VAV-HVAC system comprises a fan, a fan modulating device, a plurality of zone temperature sensors, and a controller coupled to the fan modulating device. The controller can cause the fan to change speed if the temperature readings are within or outside of bounds.

For example, high and low temperature setpoints, along with temperatures from different zones in a building are received from thermostats and sensors. Errors are then determined from various temperature readings and desired setpoints. The controller determines an appropriate fan speed based on the errors and learned commands based on previous use. The controller can also use different calibration modes to calibrate the system.

One embodiment of the invention provides a method of controlling a variable-speed fan of an environmental maintenance module that controls temperatures of a plurality of zones of a building. For each zone a zone temperature is received corresponding to that zone. A first zone temperature error is computed by calculating a difference between that zone temperature and a first setpoint of that zone. A first critical zone is identified by analyzing the first zone temperature errors. The first zone temperature error of the critical zone is used to determine a final speed setting of the variable-speed fan. In many embodiments, an information storage medium is provided having a plurality of instructions adapted to direct at least one processor to perform the method of controlling a variable-speed fan of an environmental maintenance module that controls temperatures of a plurality of zones of a building. In many embodiments, the information storage medium is part of a HVAC system.

Another embodiment of the invention provides a method of calibrating an environmental maintenance module that controls a temperature of a zone of a building. Over a time period, a plurality of temperatures of the zone are received, each zone temperature being at a different time within the time period. A location parameter is calculated for the zone temperatures. A scale parameter is computed that quantifies a variation of the zone temperatures relative to the location parameter. A first temperature setpoint is determined for the zone, wherein the environmental maintenance module uses the first temperature setpoint in controlling the temperature of the zone. In many embodiments, an information storage medium is provided having a plurality of instructions adapted to direct at least one processor to perform the method of calibrating an environmental maintenance module that controls a temperature of a zone of a building. In many embodiments, the information storage medium is part of a HVAC system.

Yet, another embodiment of the invention provides a method of calibrating an environmental maintenance module that controls a temperature of a zone of a building. A database is periodically accessed which includes prior fan speed and zone temperature information over a period of time. It is determined whether fan speed was at or above a predetermined level over an interval of time. Current low and high temperature setpoints are set according to the determination whether fan speed was at or above a predetermined level over an interval of time, wherein the environmental maintenance module uses the low and high temperature setpoints in controlling the temperature of the zone. In many embodiments, an information storage medium is provided having a plurality of instructions adapted to direct at least one processor to perform the method of calibrating an environmental maintenance module that controls a temperature of a zone of a building. In many embodiments, the information storage medium is part of a HVAC system.

Other embodiments of the invention are directed to systems and computer readable media associated with methods described herein. For example, a computer program product comprising a computer readable medium encoded with a plurality of instructions for controlling a processor to perform a method as described herein is provided.

A better understanding of the nature and advantages of the present invention may be gained with reference to the following detailed description and the accompanying drawings.

DETAILED DESCRIPTION

I. Systems Overview

Figure 1A:
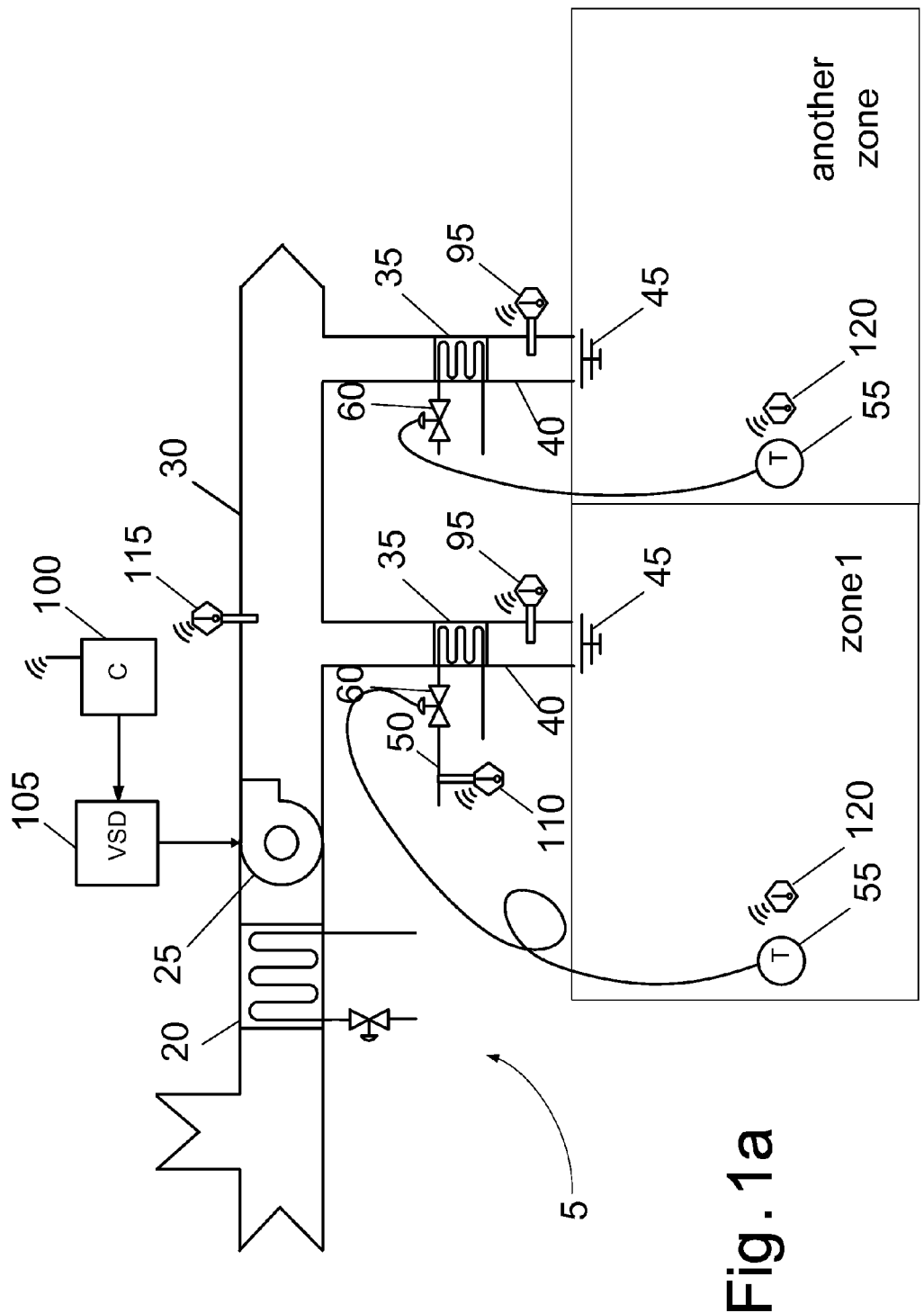
FIG. 1A is a schematic diagram of a portion of a single-duct heating, ventilating, and air-conditioning (HVAC) system made to run at constant volume, according to an embodiment of the present invention.

FIG. 1A shows a schematic diagram of a single-duct constant volume system 5, according to an embodiment of the invention. Single-duct systems 5 include a cooling coil 20, a supply fan 25, supply air ducts 30, re-heat coils 35, discharge air ducts 40, and discharge air diffusers 45. Cooling coil 20 is a heat exchanger that carries a cooling fluid such as chilled water or a chilled water and glycol solution. Cooling coil 20 is mounted in supply air duct 30. Supply fan 25 could be a centrifugal fan or an axial fan. Supply fan 25 is mounted in supply duct 30. A duct can be an elongate sheet metal structure with round or rectangular cross-section designed to transport air. Supply duct 30 contains branches that lead to re-heat coils 35. Re-heat coil 35 is a heat exchanger that carries heating fluid supplied by a hot water supply pipe 50. Re-heat coil 35 is mounted between a branch of supply duct 30 and discharge air duct 40. Discharge air duct 40 is a duct between reheat coil 35 and diffuser 45. A thermostat 55 in the occupied space of a particular zone adjusts a re-heat valve 60, which modulates the flow of heating fluid through re-heat coil 35. Re-heat valve 35 is connected to hot water supply pipe 50 and re-heat coil 35.

Figure 1B:
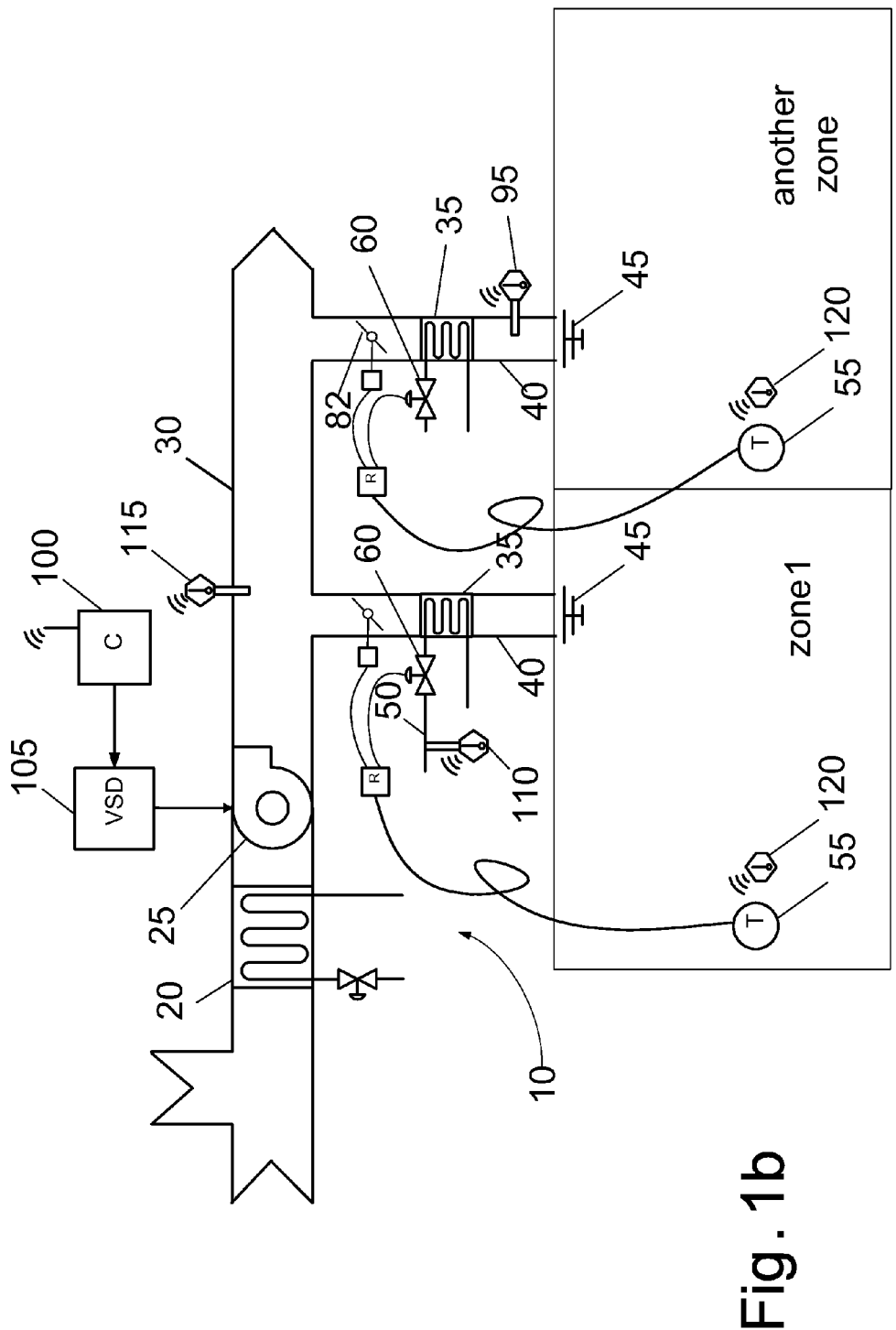
FIG. 1B is a schematic diagram of a portion of a single-duct variable-air-volume (VAV) heating, ventilating, and air-conditioning (HVAC) system, according to an embodiment of the present invention.

FIG. 1B is a schematic diagram of a portion of a single-duct VAV-HVAC system 10, according to an embodiment of the present invention. FIG. 1B is similar to the system shown in FIG. 1A, but further includes dampers 82 that regulate the flow of air.

Figure 2A:
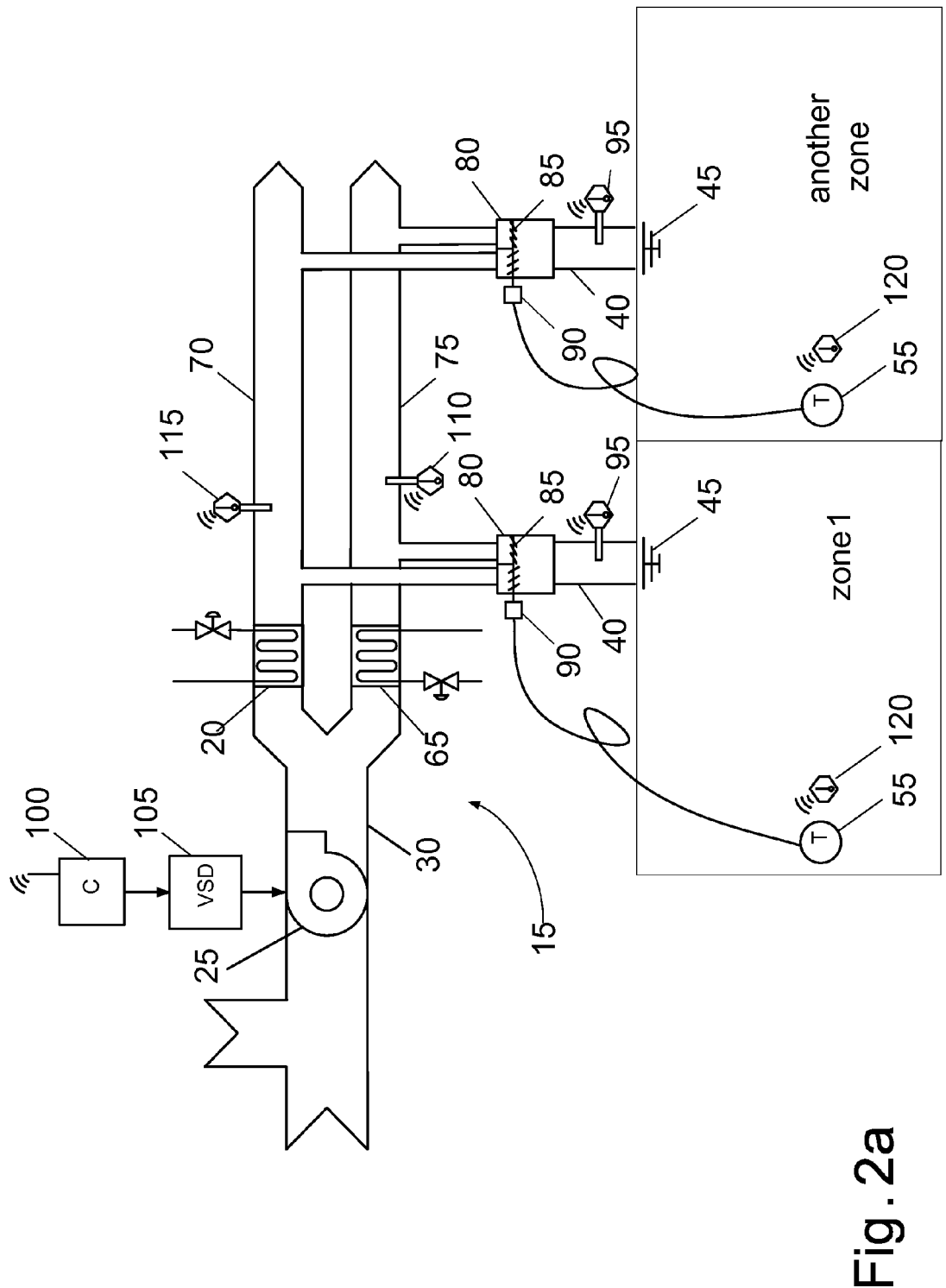
FIG. 2A is a schematic diagram of a portion of a dual-duct HVAC system with an interlocked damper, according to an embodiment of the present invention.

FIG. 2A shows a schematic diagram of a dual-duct system 15 according to an embodiment of the invention. Dual-duct systems 15 include supply fan 25, supply duct 30, cooling coil 20, a heating coil 65, a cold air duct 70, a hot air duct 75, dual duct air terminals 80, discharge air ducts 40, and diffusers 45. Supply fan 25 is mounted in supply duct 30. Supply duct 30 is connected to cold air duct 70 and hot air duct 75. Cooling coil 20 is mounted at the beginning of cold air duct 70. Heating coil 65 is mounted at the beginning of hot air duct 75. Cold air duct 70 has branches that connect to air terminals 80. Hot air duct 75 also has branches that connect to air terminals 80. Air terminals contain mixing dampers 85 that mix hot air from hot air duct 75 with cold air from cold air duct 70. Mixing dampers 85 are assemblies consisting of movable blades mounted on axles in a frame. Thermostat 55 adjusts actuator 90, which is connected to mixing dampers 85.

Figure 2B:
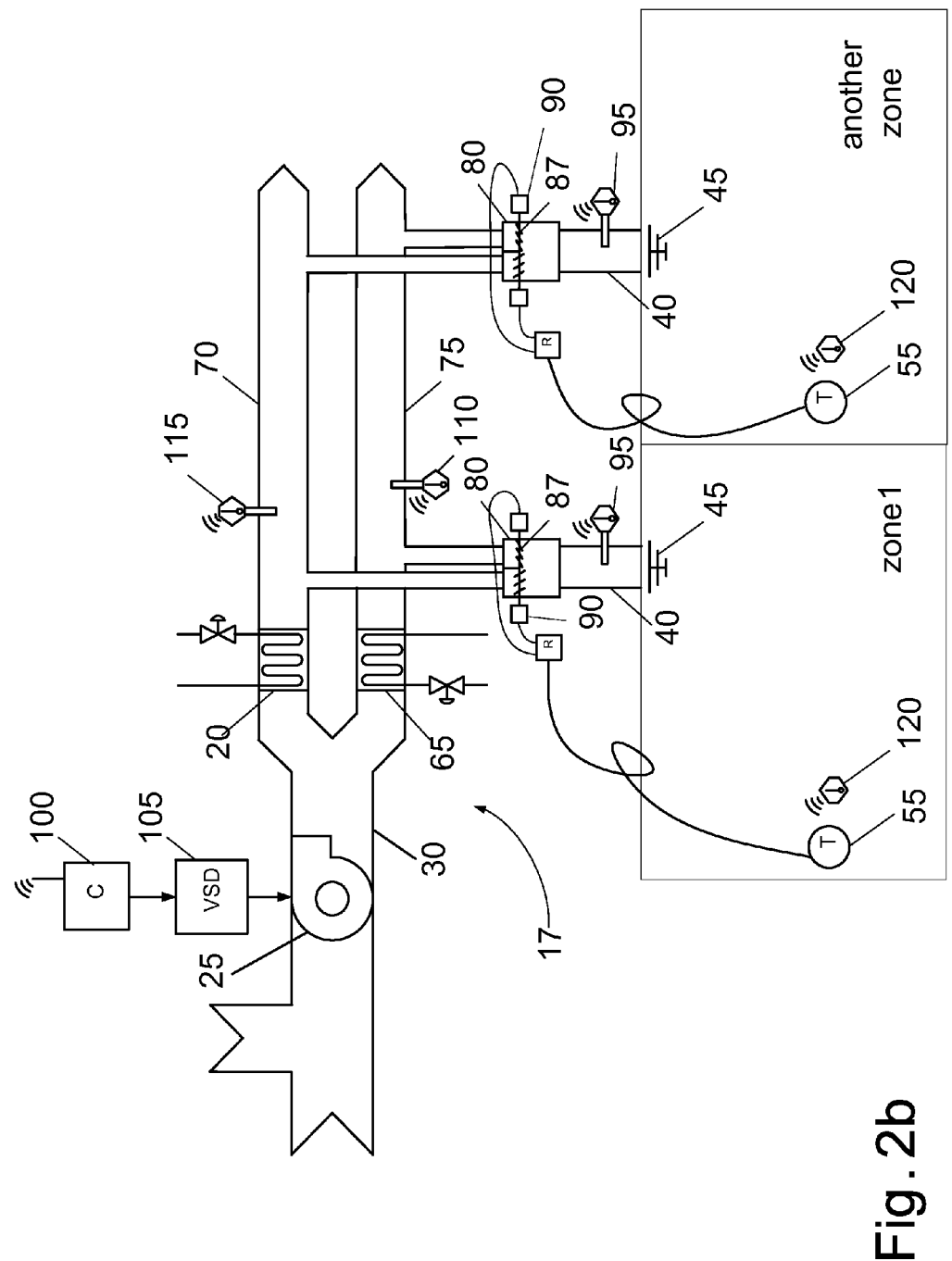
FIG. 2B is a schematic diagram of a portion of a dual-duct HVAC system with separately controlled dampers, according to an embodiment of the present invention.

FIG. 2B is a schematic diagram of a portion of a dual-duct HVAC, according to an embodiment of the present invention. The system shown in FIG. 2B is similar to the system shown in FIG. 2A, but further includes separately controlled dampers 87.

Figure 6:
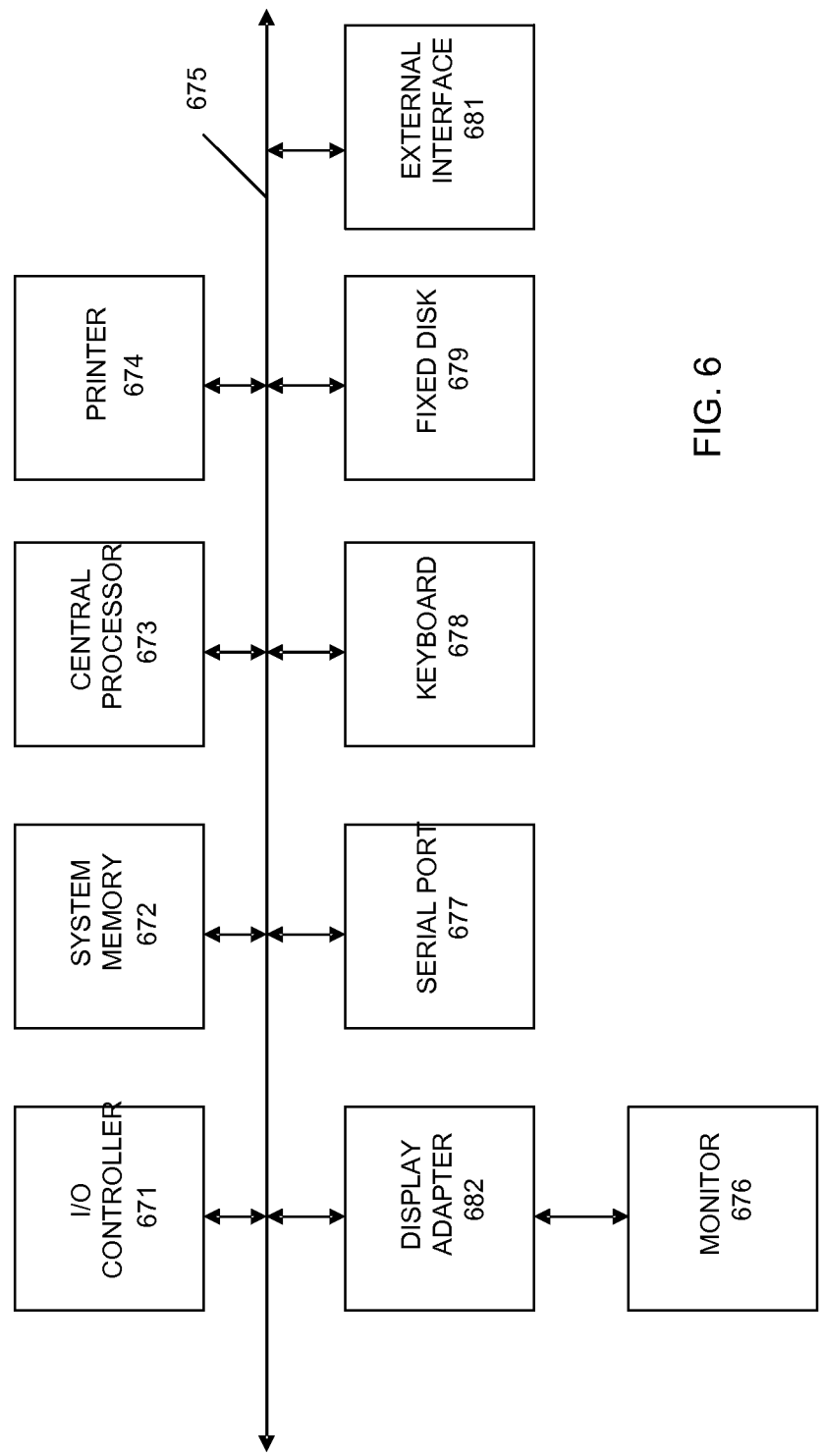
FIG. 6 is a block diagram of an exemplary computer apparatus usable with systems and methods, according to an embodiment of the present invention.

It should be noted that the systems shown in FIGS. 1A, 1B, 1C, and 1D, also include a one or more controllers/computers for operating the respective systems. The one or more controllers can be an electronic device, e.g., an integrated computer, general computer, or a server computer. The one or more controllers generally include at least one processor 673 coupled to a communications bus 675; memory coupled to the communications bus 672; and an input/output controller 671 coupled to the communications bus, for example, as shown in FIG. 6. The memory 672 can include stored instructions for execution on the processor regarding operations of the above systems. The instructions can regard any of the methods, processes, operating modes, and algorithms disclosed herein.

II. Adaptive Bounded Controls Sequence (ABCS)

Figure 3:
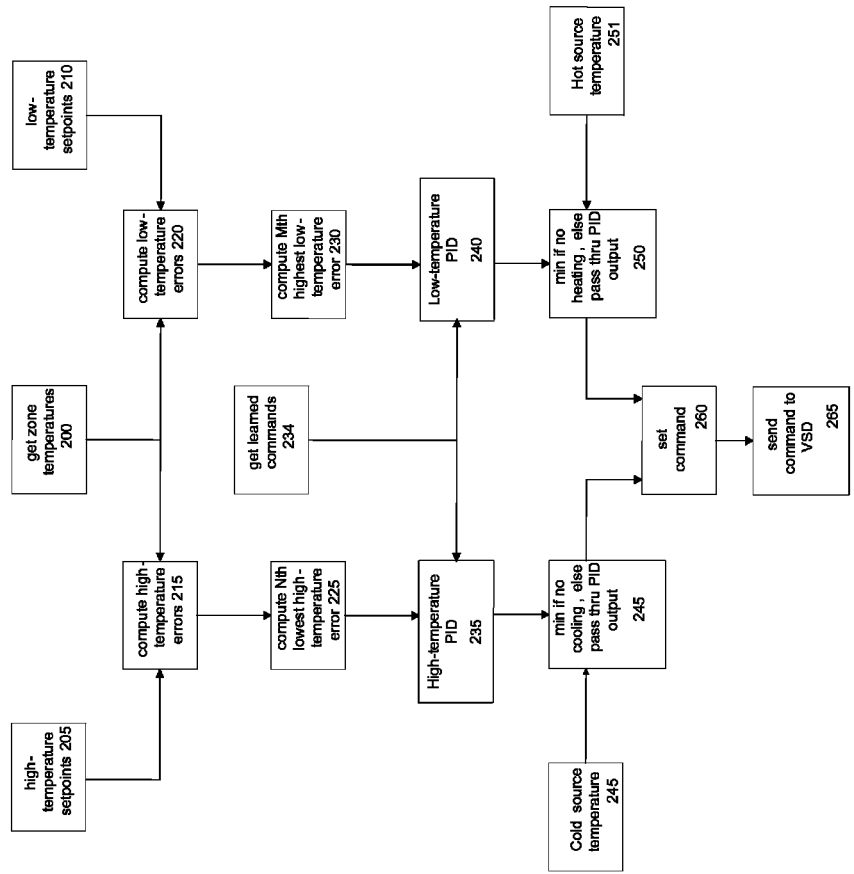
FIG. 3 is a flow diagram of a method for controlling a variable-speed fan of an environmental maintenance module that controls temperatures of a plurality of zones of a building, according to an embodiment of the present invention.

FIG. 3 is a data flow diagram of a method 300 of controlling a variable-speed fan according to an Adaptive Bounded Controls Sequence (ABCS) according to an embodiment of the invention. The method 300 shown can be used, for example, in conjunction with any of the systems shown in FIGS. 1A, 1B, 2A, and 2B.

ABCS can be applicable to constant volume air-handling units (both reheat and dual-duct) which have variable speed fan drives. ABCS can also be applicable to variable air volume (VAV) system, both reheat and dual-duct. Single-duct air-handling units make cold air that is reheated by the terminal units. Single-duct VAV systems have terminal dampers that reduce the flow to each zone so that the flow rate to each zone (when re-heating occurs) is less that the flow to each zone for a single-duct constant volume system. Dual duct air-handling units make cold air and hot air, and mix the two at the terminal units. With dual-duct constant volume air-handling units, the airflow rate to each zone is nominally constant; the mixing ratio is adjusted by the zone thermostat to keep the zone temperature close to a setpoint. With dual-duct VAV air-handling units, the hot airflow rate to each zone is adjusted when heating is needed, the cold airflow rate to each zone is adjusted when cooling is needed, and there is mixing of hot and cold air when the load is low to ensure adequate ventilation.

Air-handling units can have one or more supply fans, which can be centrifugal or axial air-moving devices driven by an electric motor. Air-handling units can also have one or more cooling coils, which can be heat exchangers designed to cool air with a cooling fluid, which is typically water, and one or more heating coils, which can be heat exchangers designed to heat air with a heating fluid that is typically hot water or steam. Cooling coils are located in a supply air duct if the system is a single-duct reheat type, or in a cold air duct (sometimes called a cold deck) if the air-handling unit is a dual-duct type. Heating coils are located in a supply air duct if the air-handling unit is a single-duct reheat type, or in a hot air duct (sometimes called a hot deck) if the air-handling unit is a dual-duct type.

Zone terminal units for a single-duct reheat system can include reheat coils, which are heat exchangers that use hot water, steam, or electricity to heat air. The reheat coil valve is modulated by the zone thermostat to keep the zone temperature close to a setpoint. Zone terminals for single-duct VAV air-handling units have a damper and a reheat coil. The damper and the reheat coil are modulated in sequence. The damper is modulated when cooling is needed, then either held at a fixed position or modulated to hold a constant flow as reheat is needed. Zone terminals for dual-duct constant volume air-handling units comprise mixing dampers that are interlocked so that one actuator is effected by the thermostat to adjust the mixing ratio. Zone terminals for dual-duct VAV air-handling units consist of mixing dampers that are not interlocked. Two actuators, one for each damper, are effected by the thermostat in sequence to keep the zone air temperature close to a setpoint.

All terminal units can discharge air into a network of discharge air ducts that are terminated in diffusers. The diffusers mix the hot or cold discharge air with zone air to avoid stratification of air temperature in the zone.

ABCS can use a wireless zone temperature sensors for feedback. The wireless zone temperature sensors may be installed near a thermostat or in some other location in a zone. ABCS optionally uses wireless temperature sensors to measure discharge air temperature, supply air temperature (single-duct) or cold deck temperature (dual-duct), and heating hot water (single-duct) or hot deck temperature (dual-duct). Heating hot water temperature can be measured by attaching a temperature probe to a heating hot water supply pipe. The wireless sensor modules for measuring discharge air temperature may be duct-mount devices with an external duct insertion probe or ceiling-mounted devices with an external probe that extends into a diffuser. Supply air temperature and cold deck temperature are also referred to as cold source temperature. A duct-mount wireless sensor module with an external duct insertion probe is used to measure cold source temperature. Hot deck temperature and heating hot water temperature are referred to as hot source temperature. Hot deck temperature is measured with a duct-mount wireless sensor module with an external duct insertion probe. Heating hot water temperature is measured with an wireless sensor module that has an external strap-on probe for the heating hot water pipe, or a well insertion probe. ABCS has one or more wireless control modules that receive speed commands over the air and transmit them to a variable speed drive of a fan motor.

In use, ABCS can reduce the fan speed so that a critical zone temperature is held close to a high-temperature setpoint or a critical zone temperature is held close to a low-temperature setpoint. In normal operation mode, ABCS uses a feedback control as shown in FIG. 3. The command is a setting of the VSD and the feedback is the temperatures of the zones. ABCS can be used on any of the systems shown in FIGS. 1A, 1B, 2A, and 2B.

In step 200, zone temperatures are received, from each zone in a corresponding system. For example, from the wireless zone temperature sensors 120 as shown in FIGS. 1A, 1B, 2A, and 2B.

In step 205, high-temperature setpoints are received, from a database or other memory, regarding each zone in the corresponding system. For example, from the wireless thermostats 55 as shown in FIGS. 1A, 1B, 2A, and 2B. In step 210, low-temperature setpoints are received. For example, from the wireless thermostats 55 as shown in FIGS. 1A, 1B, 2A, and 2B. Next zone temperature errors are computed. There are two types of zone temperature errors: high-temperature errors and low-temperature errors In step 215, high-temperature errors are computed, for each zone in the corresponding system. A high-temperature error is the difference between a zone's high-temperature setpoint and a temperature recorded by its corresponding wireless temperature sensor 120. Thus, zone temperatures are subtracted from high-temperature setpoints to determine high-temperature errors.

In step 220, low-temperature errors are computed, for each zone in the corresponding system. The low-temperature errors are the differences between the low-temperature setpoints and the associated zone temperatures. Thus, zone temperatures are subtracted from low-temperature setpoints to determine low-temperature errors.

In step 225, the Nth lowest high-temperature error is determined, regarding a critical high-temperature zone. A critical high-temperature zone is defined by the difference between a zone's high-temperature setpoint and a temperature recorded by its corresponding wireless temperature sensor 120 (referred to as a high-temperature error), and its rank with respect to other high-temperature errors. The critical high-temperature zone may be the zone with the lowest high-temperature error, or the second-lowest, or the third-lowest, e.g., Nth highest (N=2 or 3 or 4 . . . ). The critical high-temperature zone may be the zone with the highest temperature or the zone which exceeds it's upper limit the most. It is sometimes useful to avoid using the lowest, because the zone with the lowest high-temperature error may have a functional problem which is making it the lowest. If all high-temperature setpoints are the same, then the zone with the lowest high-temperature error has the highest zone temperature. In many embodiments, unoccupied zones can be ignored for determining the Nth lowest high-temperature error. In many embodiments, the critical high-temperature zone is determined by computing an average, or the median, of a plurality of high-temperature errors or low-temperature errors. For example, the top three lowest high-temperature errors may be averaged to compute the critical high-temperature zone.

In step 230, the Mth highest low-temperature error is determined, regarding a critical low-temperature zone. The low-temperature errors are the differences between the low-temperature setpoints and the associated zone temperatures. The critical low-temperature zone may be the zone with the highest low-temperature error, the second-highest low-temperature error, the third-highest low-temperature error, etc. The critical high-temperature zone may be the zone with the lowest temperature or the zone which exceeds it's lower limit the most. If all of the low-temperature setpoints are the same, then the zone with the highest low-temperature error has the lowest temperature. In many embodiments, unoccupied zones can be ignored for determining the Mth lowest low-temperature error.

In step 235, a high-temperature proportional-integral-derivative (PID) control object determines a command (e.g., a estimated high-temp speed setting for supply fan 25). In many embodiments, the PID object calculates three separate parameters: the proportional, the integral and derivative values. The proportional value determines the reaction to the current error, the integral determines the reaction based on the sum of past errors, and the derivative determines the reaction to the rate at which the error has been changing. The weighted sum of these three actions is used to determine an estimated high-temp speed setting. The estimated high-temp speed setting is partially based on the Nth lowest high temperature error of the high-temperature critical zone. The high-temperature PID control object can also take input from learned previous commands, as discussed herein.

In step 240, a low-temperature proportional-integral-derivative (PID) control object determines a command (estimated low-temp speed setting for supply fan 25). The estimated low-temp speed setting is partially based on the Mth highest low temperature error, which defines the low-temperature critical zone. The low-temperature PID control object can also take input from learned previous commands. In many embodiments, the critical low-temperature zone is determined by computing an average, or the median, of a plurality of low-temperature errors. For example, the three highest low-temperature errors may be averaged to compute the critical low-temperature zone.

In step 234, the PID control objects of ABCS accept learned commands as inputs. Learned commands are learned from commands computed on previous days. Learning from the previous commands is performed over previous time intervals. The time intervals are generally longer than the periods between ABCS updates (e.g., 15 minutes), and include day types that correspond to days of the week and holidays, or weekdays, weekends, and holidays. After each interval passes, the learned command for that interval is updated as follows:

$$\text{LearnedCommand}(i,n,d) = (1-p/P)\text{LearnedCommand}(i-1,n,d) + p/P \cdot C(i,n,d)$$

Where i is the index for the current learned command (a time index), n is an index for the nth interval in a frame of intervals (e.g., 15-minute intervals in a day), d is the index for the interval type (e.g., day of week), p is the period between like nth indexes (one week if each day type is a day of the week, one day if each day type is the same), P is a user-configurable learning time constant (typically three weeks), and C(i,n,d) is the most recent command corresponding to index i, interval n, and interval type d. When the Learned Command interval is longer than t, the update period for ABCS (which is typical), the learned commands passed to PID objects are computed by interpolation.

It should be noted that the high and low-temperature PID control objects can have anti-windup features for their integrators. Anti-windup features prevent the integrator from integrating if the output of the PID object is at its maximum or minimum.

In step 245, if cooling is disabled, the high-temperature fan setting command output is a predetermined minimum high command output, otherwise it is the command output of the high-temperature PID control object from step 235. The minimum high command output is a predetermined fan speed necessary to ensure adequate ventilation. The temperature readings from the cold source sensor 246 can be used to determine whether or not cooling is disabled. Other mechanisms may be available for determining whether or not cooling is disabled, such as time of day if cooling is known to be disabled at certain times of the day.

In step 250, if the heating is disabled, the low-temperature fan setting command output is a minimum low command output, otherwise it is the command output of the low-temperature PID control object from step 240. The minimum low command output is a predetermined fan speed necessary to ensure adequate heating. The temperature readings from the hot source sensor 251 can be used to determine whether or not heating is disabled. Other mechanisms may be available for determining whether or not heating is disabled, such as time of day if cooling is known to be disabled at certain times of the day.

In step 260, the command to the variable speed drive is set to the maximum of the high-temperature command output and the low-temperature command output, as determined in steps 245 and 250, respectively. In step 265, the high temperature command output and low-temperature command output are sent to the VSD 105.

In many embodiments, temperature settings via the thermostat in each zone are not used. If the thermostat setting is high, then the location parameter in the calibration will be high; if the thermostat setting is low, then the location parameter will be low.

III. Calibration

A. Automatic Calibration Mode

Figure 4:
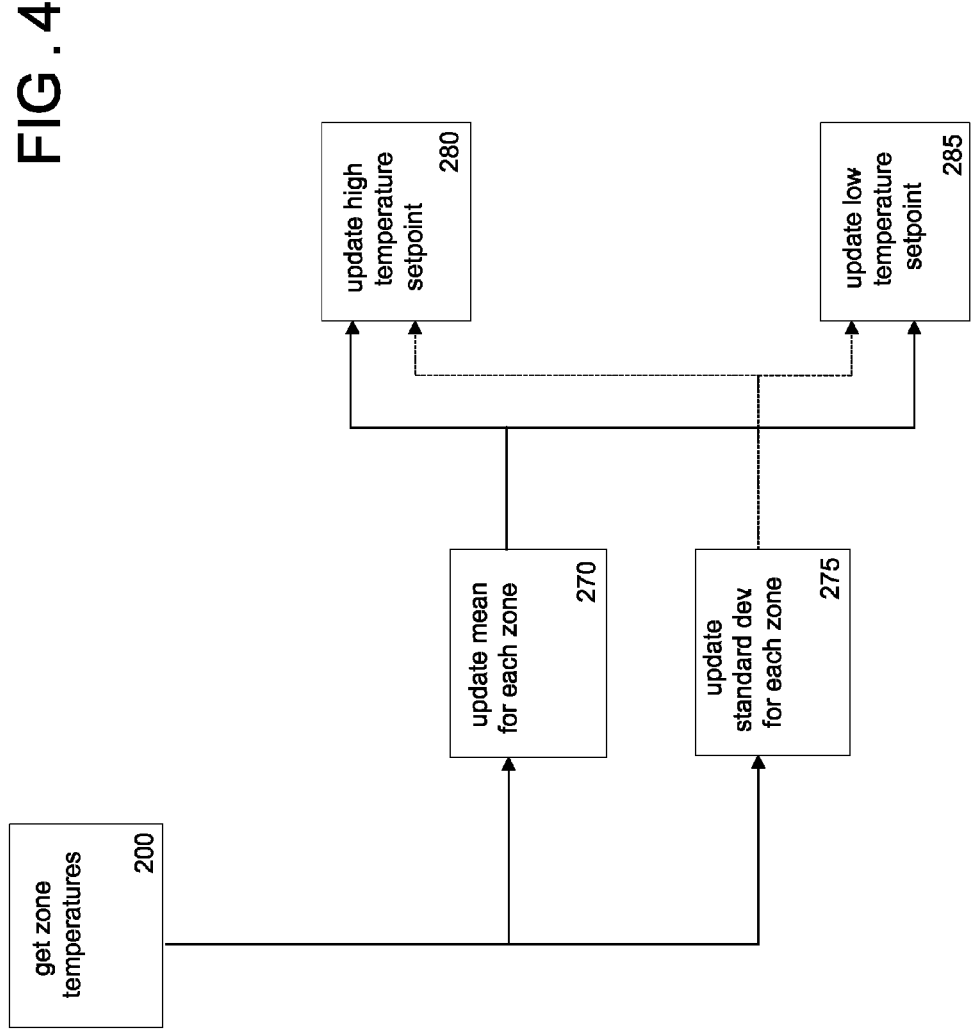
FIG. 4 is a flow diagram of a setpoint update process, according to an embodiment of the present invention.

FIG. 4 shows a method for switching to an automatic calibration mode, according to one embodiment of the invention. ABCS can switch from a normal mode (e.g. as shown in FIG. 3) to an automatic calibration mode when its output has been 100%, e.g., fan operating at maximum speed, for at least a user-configurable period of time, for example, 30 minutes. In automatic calibration mode, ABCS will continue to execute the feedback loop calculations described above, and it will update the high-temperature and low-temperature setpoints. The setpoints are updated in steps 270 and 275 by recursively computing statistics for each zone temperature: mean and standard deviation, respectively. The mean zone temperature is computed as follows:

$$\text{ZoneMean}(k,j) = (1-t/T)\text{ZoneMean}(k-1,j) + t/T \text{ZoneTemperature}(k,j) \quad (1)$$

where k is a time index, j is an index for the jth zone, t is the time between updates, and T is a time constant for learning the mean. The standard deviation is computed recursively from the mean absolute deviation from the mean:

$$\text{ZoneMAD}(k,j) = (1-t/T)\text{ZoneMAD}(k-1,j) + t/T \text{ abs}(\text{ZoneTemp}(k,j) - \text{ZoneMean}(k,j)) \quad (2)$$

$$\text{ZoneStd}(k,j) = \text{sqrt}(pi/2) * \text{ZoneMAD}(k,j) \quad (3)$$

The mean is an example of a location parameter. Another example of a location parameter is the median. The standard deviation is an example of a scale parameter. The scale parameter quantifies a variation of the zone temperatures relative to the location parameter. Another example of a scale parameter is the mean absolute deviation from a location parameter. Other location parameters and scale parameters, known to one skilled in the art, may be used.

The high temperature setpoints are computed as follows in step 280:

$$\text{High}SP(j) = \text{ZoneMean}(j) + \max(\text{LowerLimit}, \min(\text{UpperLimit}, Z*\text{ZoneStd})) \quad (4)$$

And the low-temperature setpoints are computed as follows in step 285:

$$\text{Low}SP(j) = \text{ZoneMean}(j) - \max(\text{LowerLimit}, \min(\text{UpperLimit}, Z*\text{ZoneStd})) \quad (5)$$

where Z user-configurable parameter that determines how far the setpoints deviate from the average temperature relative to the historical variation of the temperature. Z can be, for example, 1.65. If the temperature variation follows a normal distribution, then the low-temperature and high-temperature setpoints will be at the 5% and 95% levels of the normal distribution.

Equation 3 is the mean absolute deviation around the mean. The sqrt(pi/2) is the theoretical relationship between the mean absolute deviation and standard deviation for a normal (Gaussian) distribution. In many embodiments, the mean absolute deviation is robust compared to the typical mean squared calculation for the standard deviation. Converting the mean absolute deviation to standard deviation with sqrt(pi/2) allows probabilities associated with the standard deviation (which are well-known and readily available in any statistics book) to be used to set the value of Z in Equations 4 and 5.

ABCS can transition back from automatic calibration mode to normal mode when the computed command to the variable speed drive becomes less than 100%.

During calibration or ABCS, the high-temperature setpoints may be raised (and/or the low-temperature setpoints lowered) in response to a "demand response" event message. A demand response event message occurs when the utility or grid operator determines that the grid demand (either system-wide or locally) is near grid capacity. The demand response message is dispatched through a number of means so that end users will lower their demand for electricity.

B. Scheduled Mode

In many embodiments, ABCS transitions from normal mode to timed calibration mode when instructed to do so by the operator or by a scheduled event. In timed calibration mode, ABCS first starts a timer that determines how long ABCS will remain in timed calibration mode. The timer length is user-configurable. Then ABCS sets the fan speed to 100%. In timed calibration mode, ABCS updates the mean and standard deviation as in automatic calibration mode, but it does not need to update the setpoints until it exits timed calibration mode because the setpoints may not used in timed calibration mode. ABCS switches from timed calibration mode to normal mode when the timer expires.

C. Batch Mode

In many embodiments, ABCS periodically (e.g., once per day, per week, or per month) transitions to batch mode. In batch mode, ABCS utilizes a database of prior recorded zone setting, fan speed, and temperature information. In batch mode, ABCS can determine from the database contiguous time intervals in a calibration period (e.g., week, two weeks, month) when the fan speed was (nearly) 100%, and determine the maximum (or nearly maximum) and minimum (or nearly minimum) temperature for each zone temperature when the fan speed was (nearly) 100%. The ABCS can then set the low temperature setpoint for each zone to its (nearly) minimum value calculated, and set the high temperature setpoint for each zone to its (nearly) maximum value. In many embodiments, if there is no contiguous time interval in the calibration period when the fan speed was (nearly) 100%, ABCS can then raise the low setpoints by X % of the difference between the high and low setpoints, and lower the high setpoints by X % of the difference between the high and low setpoints, where X is a user-selectable parameter between 0 and 50 (e.g., 10). In many embodiments, if there is no contiguous time interval in the calibration period when the fan speed was (nearly) 100%, ABCS can schedule to fan to run at 100% for a predetermined about of time, so that when batch mode is run in the future ABCS can compute low and high temperature setpoints.

D. Transitions Between the Modes

Figure 5:
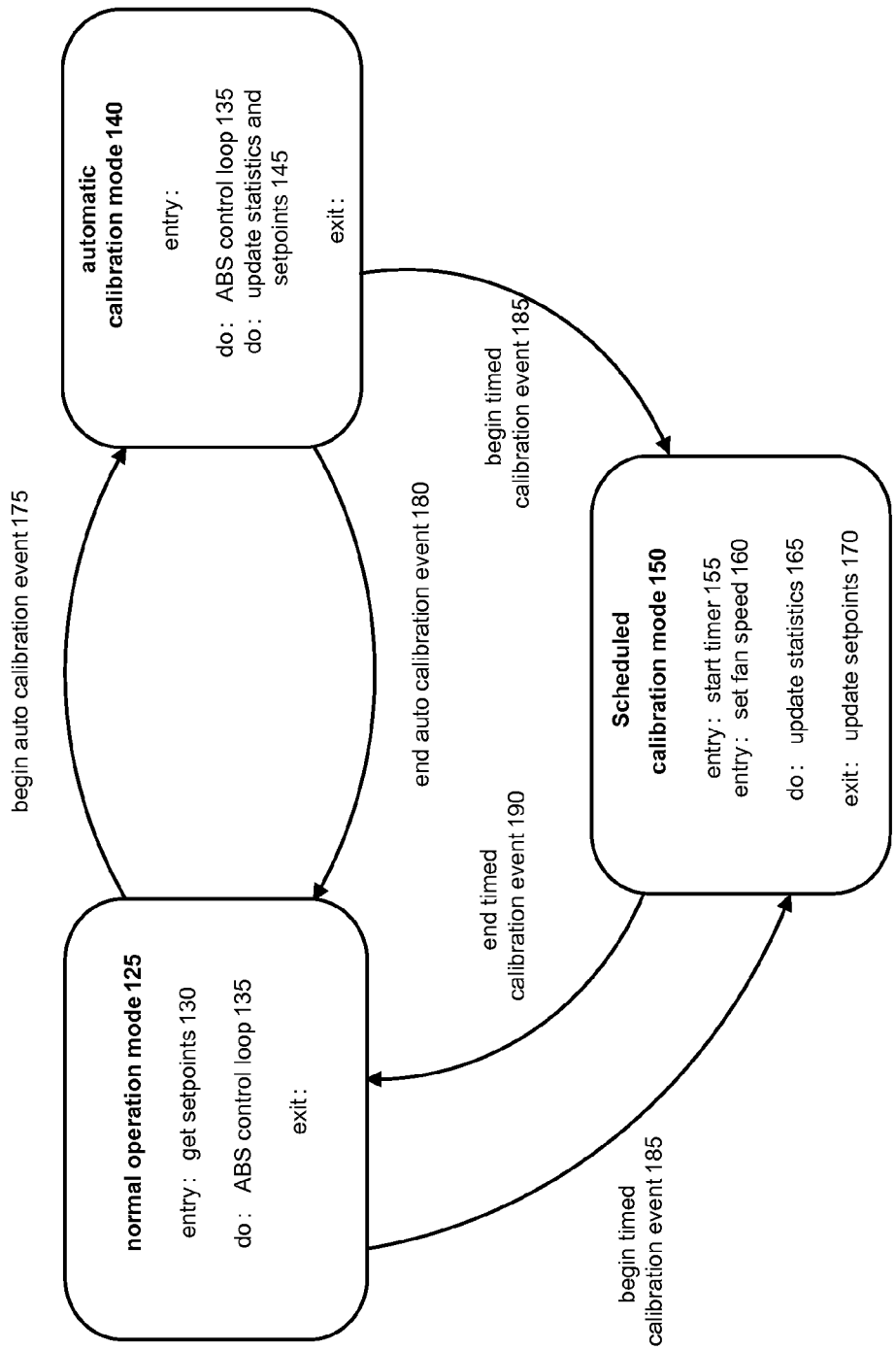
FIG. 5 is a state transition diagram of a control algorithm, according to an embodiment of the present invention.

FIG. 5 is a state transition diagram of the control algorithm, according to an embodiment of the present invention. ABCS includes the calibration operating modes as disclosed herein, which are normal operation 125, automatic calibration mode 140, and manual/scheduled calibration mode 150. In normal operation 125, the control algorithm may be inputted with or retrieve setpoints 130 and execute a control loop 135. As described herein, the normal operation 125 may switch to automatic calibration mode 140, when an auto calibration event 175 occurs, e.g., the fan output has been 100% for a predetermined amount of time. The automatic calibration mode 140 may switch to normal operation mode 125 when an auto calibration event 185 ends, e.g., the fan output becomes less than 100%. In the automatic calibration mode 140, the control algorithm executes a control loop 135 and updates statistics and setpoints 145. The automatic calibration mode 140 may switch to the scheduled calibration mode 150 when a calibration event 185 occurs. In the scheduled calibration mode 150, the control algorithm may be inputted with or retrieve start timer 155 and fan speed 160 settings, and update statistics 165 and update setpoints 170. The scheduled calibration mode 150 may switch to the normal operation mode 125 when a timed calibration event ends 190, e.g., when a timer stops. The normal operation mode 125 may switch to the scheduled calibration mode 150 when a calibration event 185 ends.

Any systems shown in FIGS. 1A, 1B, 2A, and 2B implementing methods, processes, operating modes, and algorithms disclosed herein, may utilize any suitable number of subsystems. Examples of such subsystems or components are shown in FIG. 6. The subsystems shown in FIG. 6 are interconnected via a system bus 675. Additional subsystems such as a printer 674, keyboard 678, fixed disk 679, monitor 676, which is coupled to display adapter 682, and others are shown. Peripherals and input/output (I/O) devices, which couple to I/O controller 671, can be connected to the computer system by any number of means known in the art, such as serial port 677. For example, serial port 677 or external interface 681 can be used to connect the computer apparatus to a wide area network such as the Internet, a mouse input device, or a scanner. The interconnection via system bus allows the central processor 673 to communicate with each subsystem and to control the execution of instructions from system memory 672 or the fixed disk 679, as well as the exchange of information between subsystems. The system memory 672 and/or the fixed disk 679 may embody a computer readable medium.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the methods described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately. Any such computer readable medium may reside on or within a single computer program product (e.g., a hard drive or an entire computer system), and may be present on or within different computer program products within a system or network.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of controlling a variable-speed fan of an environmental maintenance module that controls temperatures of a plurality of zones of a building, the method comprising:
 (a) for each of the plurality of zones:
  receiving a zone temperature corresponding to that zone; and
  computing a first zone temperature error by calculating a difference between that zone temperature and a first setpoint of that zone;
 (b) identifying a first critical zone from the plurality of zones by analyzing the first zone temperature errors;
 (c) using the first zone temperature error of the first critical zone to determine a final speed setting of the variable-speed fan; and
 (d) controlling, with a controller, the variable-speed fan based on the final speed setting.

2. The method of claim 1, further comprising:
repeating (a)-(d) at periodic intervals.

3. The method of claim 1, wherein the first zone setpoint of each zone is a high temperature setpoint.

4. The method of claim 1, further comprising:
for each of the plurality of zones:
 computing a second zone temperature error by calculating a difference between that zone temperature and a second setpoint of that zone;
identifying a second critical zone from the plurality of zones by analyzing the second zone temperature errors; and
using the second zone temperature error of the second critical zone to determine a second speed setting of the variable-speed fan.

5. The method of claim 4, wherein the first zone setpoint of each zone is a low temperature setpoint, and wherein the second setpoint of each zone is a high temperature setpoint.

6. The method of claim 4, further comprising:
calculating a first estimated speed setting of the variable-speed fan based on the first zone temperature error; and
calculating a second estimated speed setting of the variable-speed fan based on the second zone temperature error, wherein the second estimated speed setting is the second speed setting.

7. The method of claim 6, wherein the final speed setting is maximum of the first estimated speed setting and the second estimated speed setting.

8. The method of claim 6, wherein the final speed setting is a maximum of the first estimated speed setting, and a minimum of the second estimated speed setting.

9. The method of claim 1, further comprising:
receiving a temperature measurement from at least one sensor of each zone; and
using the temperature measurement to determine the zone temperature of the corresponding zone.

10. The method of claim 9, further comprising:
receiving temperature measurements from a plurality of sensors of each zone; and
calculating the zone temperature from an average of the temperature measurements from the sensors.

11. The method of claim 1, further comprising:
raising the first setpoint of each zone in response to a demand response event message.

12. The method of claim 1, wherein the first critical zone is identified by determining an average or median of at least a portion of the first zone temperature errors.

13. A method of calibrating an environmental maintenance module that controls a temperature of a zone of a building, the method comprising:
(a) receiving, over a time period, a plurality of temperatures of the zone, each zone temperature being at a different time within the time period;
(b) calculating a location parameter for the zone temperatures;
(c) computing a scale parameter that quantifies a variation of the zone temperatures relative to the location parameter;
(d) determining a first temperature setpoint for the zone based on the location parameter and the scale parameter, wherein the environmental maintenance module uses the first temperature setpoint in controlling the temperature of the zone.

14. The method of claim 13, wherein (b)-(d) are repeated when a new temperature of the zone is received, and wherein (b)-(d) use a fixed number of the most recent temperatures.

15. The method of claim 13, further comprising:
determining a second temperature setpoint for the zone, wherein the environmental maintenance module uses the second temperature setpoint in controlling the temperature of the zone.

16. The method of claim 13, wherein a command determines a speed setting of a variable-speed fan of the environmental maintenance module, wherein the calibration is initiated when the command is computed to run the variable-speed fan at a specific capacity for a set period of time.

17. The method of claim 13, wherein the location parameter is a mean or a median of the zone temperatures.

18. An HVAC system, comprising:
an environmental maintenance module including at least one variable-speed fan operatively coupled to a plurality of zones of a building;
a controller operatively coupled to the environmental maintenance module for controlling the variable-speed fan, the controller including at least one processor configured to:
(a) for each of the plurality of zones:
receive a zone temperature corresponding to that zone; and
compute a first zone temperature error by calculating a difference between that zone temperature and a first setpoint of that zone;
(b) identify a first critical zone from the plurality of zones by analyzing the first zone temperature errors; and
(c) use the first zone temperature error of the first critical zone to determine a final speed setting of the variable-speed fan.

19. An HVAC system, comprising:
an environmental maintenance module configured to control a temperature of a zone of a building;
a controller operatively coupled to the environmental maintenance module for calibrating the environmental maintenance module, the controller including at least one processor configured to:
(a) receive, over a time period, a plurality of temperatures of the zone, each zone temperature being at a different time within the time period;
(b) calculate a location parameter for the zone temperatures;
(c) compute a scale parameter that quantifies a variation of the zone temperatures relative to the location parameter;
(d) determine a first temperature setpoint for the zone based on the location and parameter and the scale parameter, wherein the environmental maintenance module uses the first temperature setpoint in controlling the temperature of the zone.

20. A method of calibrating an environmental maintenance module that controls a temperature of a zone of a building, the method comprising:
(a) periodically accessing a database which includes prior fan speed information and zone temperature information over an interval of time;
(b) determining from the prior fan speed information whether a fan speed was at or above a predetermined level over the interval of time;
(c) setting current low and high temperature setpoints according to the determination whether the fan speed was at or above the predetermined level over the interval of time, wherein the environmental maintenance module uses the low and high temperature setpoints in controlling the temperature of the zone.

21. The method of claim 20, wherein the predetermined level is 100%.

22. The method of claim 20, wherein the fan speed is determined to be below the predetermined level over the interval of time, and further comprising determining a percentage difference between previous low and high temperature setpoints over the period of time, and wherein the current low and high temperature setpoints are set according to applying the percentage difference to the previous low and high temperature setpoints.

23. The method of claim 22, wherein the current low temperature setpoint is raised by the percentage difference between the previous low and high temperature setpoints, and the current high temperature setpoint is lowered by the percentage difference between the previous low and high temperature setpoints.

24. The method of claim 22, further comprising scheduling a future interval of time to set the fan speed at or above the predetermined level prior to a subsequent operation of steps (a), (b), and (c).

25. An HVAC system, comprising:
- an environmental maintenance module configured to control a temperature of a zone of a building;
- a controller operatively coupled to the environmental maintenance module for calibrating the environmental maintenance module, the controller including at least one processor configured to:
  - periodically access a database which includes prior values for a fan speed and zone temperature information over a plurality of time intervals in a period of time;
  - determine whether the fan speed was at or above a predetermined level over any time interval in the time period;
  - set current low and high temperature setpoints according to the determination whether the fan speed was at or above a predetermined level over an interval of time, wherein the environmental maintenance module uses the low and high temperature setpoints in controlling the temperature of the zone.

* * * * *

UNITED STATES PATENT AND TRADEMARK OFFICE
CERTIFICATE OF CORRECTION

PATENT NO. : 8,688,243 B2  
APPLICATION NO. : 13/481700  
DATED : April 1, 2014  
INVENTOR(S) : Federspiel et al.

Page 1 of 1

It is certified that error appears in the above-identified patent and that said Letters Patent is hereby corrected as shown below:

In the Claims:

Column 13, Line 12, Claim 7: please insert --a-- before "maximum".

Column 13, Lines 42-43, Claim 13: after "parameter;" please insert --and--.

Column 14, Line 31, Claim 19: after "parameter;" please insert --and--.

Column 15, Line 17, Claim 25: after "period;" please insert --and--.

Signed and Sealed this  
Twelfth Day of August, 2014

Michelle K. Lee  
*Deputy Director of the United States Patent and Trademark Office*